US012482351B2

(12) United States Patent
Tozawa et al.

(10) Patent No.: US 12,482,351 B2
(45) Date of Patent: Nov. 25, 2025

(54) SIGNAL CONTROL APPARATUS, SIGNAL CONTROL METHOD AND PROGRAM

(71) Applicant: NEC Corporation, Tokyo (JP)

(72) Inventors: Nobuyuki Tozawa, Tokyo (JP); Satoshi Kimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 176 days.

(21) Appl. No.: 18/279,329

(22) PCT Filed: Mar. 4, 2021

(86) PCT No.: PCT/JP2021/008402
§ 371 (c)(1),
(2) Date: Aug. 29, 2023

(87) PCT Pub. No.: WO2022/185476
PCT Pub. Date: Sep. 9, 2022

(65) Prior Publication Data
US 2024/0153379 A1 May 9, 2024

(51) Int. Cl.
*G08G 1/082* (2006.01)
*G08G 1/01* (2006.01)

(52) U.S. Cl.
CPC ........... *G08G 1/082* (2013.01); *G08G 1/0116* (2013.01); *G08G 1/0133* (2013.01); *G08G 1/0145* (2013.01)

(58) Field of Classification Search
CPC .... G08G 1/082; G08G 1/0116; G08G 1/0133; G08G 1/0145; G08G 1/0125; G08G 1/00; G08G 1/01; G08G 1/0104; G08G 1/0129; G08G 1/0112; G08G 1/0965; G08G 1/167; G08G 1/22; G08G 1/0108; G08G 1/096716; G08G 1/096741; G08G 1/096775; G08G 1/08; G08G 1/081; G08G 1/0137; G01C 21/3658; G01C 21/00; G01C 21/26;
(Continued)

(56) References Cited

FOREIGN PATENT DOCUMENTS

| | | |
|---|---|---|
| JP | H04-142700 A | 5/1992 |
| JP | 2007-328454 A | 12/2007 |
| JP | 2009-146137 A | 7/2009 |

(Continued)

OTHER PUBLICATIONS

International Search Report for PCT Application No. PCT/JP2021/008402, mailed on May 25, 2021.

*Primary Examiner* — Brian A Zimmerman
*Assistant Examiner* — Anthony D Afrifa-Kyei
(74) *Attorney, Agent, or Firm* — Sughrue Mion, PLLC

(57) ABSTRACT

A signal control apparatus is connected to a plurality of traffic signals located on a road with a plurality of intersections having travel lanes with designated traffic classifications. The signal control apparatus comprises: means for detecting the number of vehicles staying in the travel lane or lanes of the same traffic classification among the travel lanes of the plurality of intersections; means for determining whether or not to extend or reduce signaling time for permitting traffic of the traffic classification of the travel lane or lanes based on the number of vehicles staying in the travel lane or lanes of the same traffic classification at the plurality of intersections and means for adjusting split of the plurality of traffic signals based on a result of the determination so as to extend or reduce the signaling time.

17 Claims, 13 Drawing Sheets

(58) Field of Classification Search
CPC .... G01C 21/34; G01C 21/36; G01C 21/3626; G01C 21/3492
See application file for complete search history.

(56) References Cited

FOREIGN PATENT DOCUMENTS

| | | | | | |
|---|---|---|---|---|---|
| JP | 2017004370 | A | * | 1/2017 | |
| JP | 2017-084120 | A | | 5/2017 | |
| JP | 2018-049368 | A | | 3/2018 | |
| JP | 2020-135315 | A | | 8/2020 | |
| KR | 102184914 | B1 | * | 12/2020 | ............... G06N 3/08 |
| WO | 2016/147350 | A1 | | 9/2016 | |

* cited by examiner

SIGNAL CONTROL APPARATUS, SIGNAL CONTROL METHOD AND PROGRAM

FIELD

The present invention relates to a signal control apparatus, a signal control method and a program.

BACKGROUND

Intersections are widely used, which have travel lanes (a travel lane) with designated traffic classifications and allow right-turning vehicles and the like to safely turn right and the like by fixed-time traffic lights or a green arrow light. Since such travel lanes with designated traffic classification often cause traffic congestion, a turn right sensing control is also performed, in which the number of staying vehicles which intend to turn right is measured by a vehicle detector and a right-turn-only signaling time (green arrow signal indication time) is extended or terminated. In addition, on roads of heavy traffic, a system control is also performed in which an offset as one of signal control parameters is set to a traffic signal at an adjacent intersection so as to allow vehicles to travel smoothly. Further, a regional control (wide-area control) is also performed in which this system control is expanded to a certain area so as to perform a traffic control as a plane.

Patent Literature 1 (PTL 1) discloses an example of traffic light control method in which signaling time of a green light is shortened or extended. Concretely, the traffic light control method detects an absent section of a predetermined length, which is located at both ends of upstream lanes or downstream lanes of a predetermined section on a focus road including an intersection with a traffic signal to be a control target (e.g., an arterial road) and on which there are no vehicles traveling toward the intersection, and the speed of a vehicle which is located at the beginning of this absent section. Then, the arrival time of the vehicle at the intersection is calculated, and based on this calculation result, signaling time for focus road side green light is shortened or extended by starting from the time when the vehicle should pass through the intersection.

PTL 2 discloses a signal control apparatus that may reduce the possibility of deadlock occurrence in a particular direction caused by control timing interaction of multiple adjacent traffic signals. PTL 3 discloses a right-turn-sensing control system, that temporarily changes signal control parameters according to the number of vehicles waiting of turn right, obtained by cameras installed in the intersection so as to extend or shorten signaling time of right-turn arrow and signaling time of yellow and red signal lights.

PTL 1: Japanese Patent Kokai Publication No. JPH04-142700A

PTL 2: Japanese Patent Kokai Publication No. JP2017-004370A

PTL 3: Japanese Patent Kokai Publication No. JP2007-328454A

SUMMARY

The following analysis is provided by the present inventors. The following problems are considered when extension or shortening of signaling time of the focus road side green light is executed as disclosed in PTL 1. In a case where only performed is extension or shortening of signaling time of green light, since the cycle length at the traffic signal would be extended or shortened due to the extension or shortening of signaling time of the green light, the system control using offset having been set to the focus road would be spoiled. In addition, a method may be considered, in which signaling time of the other signal color is shortened or extended according to an extent of shortening or extension of signaling time of green light so as to maintain a cycle length. However, such case has a possibility of worsening congestion and the like when other signal colors to be shortened or extended are not properly selected.

It is a purpose of the present invention to provide a signal control apparatus, a signal control method and a program suitable for a road on which system control is performed by setting an offset between adjacent traffic signals as a control parameter.

Solution to Problem

According to a first aspect, there is provided a signal control apparatus, which is connected to a plurality of traffic signals located on a road with a plurality of intersections having travel lanes with designated traffic classifications, and which comprises: means for detecting the number of vehicles staying in the travel lane or lanes of the same traffic classification among the travel lanes of the plurality of intersections; means for determining whether or not to extend or reduce signaling time for permitting traffic of the traffic classification of the travel lane or lanes based on the number of vehicles staying in the travel lane or lanes of the same traffic classification at the plurality of intersections; and means for adjusting split of the plurality of traffic signals based on a result of the determination so as to extend or reduce the signaling time for permitting traffic of the traffic classification of the travel lane or lanes while maintaining offset being set for the plurality of traffic signals.

According to second aspect, there is provided a signal control method, in which a signal control apparatus connected to a plurality of traffic signals located on a road with a plurality of intersections having travel lanes with designated traffic classifications executes: detecting the number of vehicles staying in a travel lane or lanes of the same traffic classification among the travel lanes of the plurality of intersections; determining whether or not to extend or reduce signaling time for permitting traffic of the traffic classification of the travel lane or lanes based on the number of vehicles staying in the travel lane or lanes of the same traffic classification at the plurality of intersections; and adjusting split of the plurality of traffic signals based on a result of the determination so as to extend or reduce the signaling time for permitting traffic of the traffic classification of the travel lane or lanes while maintaining offset being set for the plurality of traffic signals. This method is connected to a specific machine as a signal control apparatus connected to a plurality of traffic signals located on a road.

According to a third aspect, there is provided a program which causes a computer configuring a signal control apparatus connected to a plurality of traffic signals located on a road with a plurality of intersections having travel lanes with designated traffic classification to execute: a process of detecting the number of vehicles staying in a travel lane or lanes of the same traffic classification among the travel lanes of the plurality of intersections; a process of determining whether or not to extend or reduce signaling time for permitting traffic of the traffic classification of the travel lane or lanes based on the number of vehicles staying in the travel lane or lanes of the same traffic classification at the plurality of intersections; and a process of adjusting split of the plurality of traffic signals based on a result of the determination so as to extend or reduce the signaling time for permitting traffic of the traffic classification of the travel lane or lanes while maintaining offset being set for the plurality of traffic signals. The program is input to a computer apparatus from an input apparatus or an external device via a communication interface, stored in a storage apparatus, and drives a processor according to a predetermined step or process. In addition, the program may display a process result including an intermediate state step by step via a display apparatus, as necessary, or communicate with an external device via the communication interface. A computer apparatus for this purpose, as an example, comprises a processor, a storage apparatus, an input apparatus, a communication interface and display apparatus, as necessary, which may be typically connected one another by a bus. Further, the program may be stored in a computer readable (non transitory) storage medium.

According to the present invention, it is realized to contribute to improve the efficiency of sweeping out vehicles staying in certain travel lanes while maintaining system control.

EXAMPLE EMBODIMENTS

Figure 1:
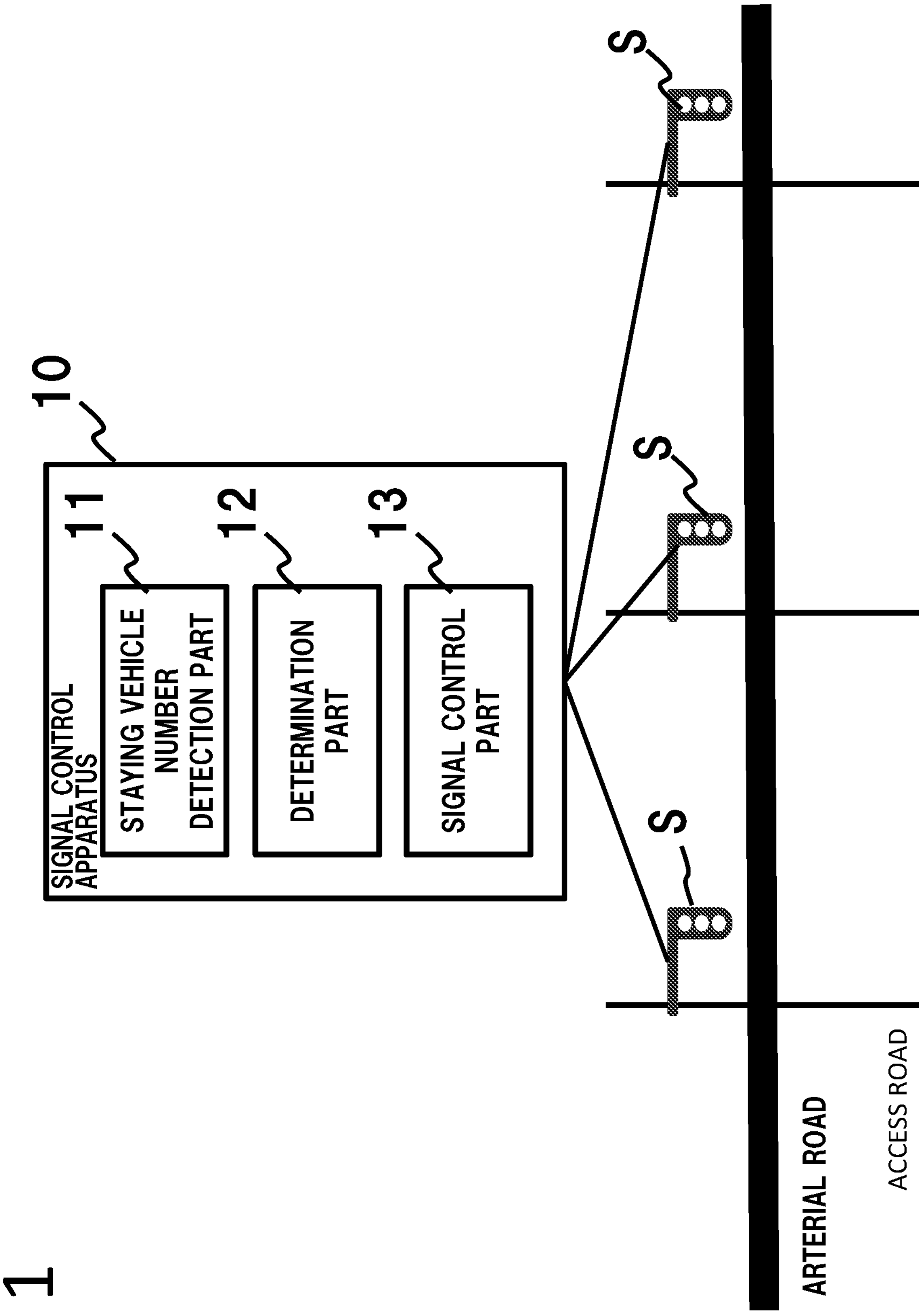
FIG. 1 is a diagram showing a configuration of a signal control apparatus of a first exemplary embodiment of the present invention.

Next, an exemplary embodiment of the present invention is explained while referring to drawings. Herein, reference signs appended to the following exemplary embodiment are expediently appended to each element as one example for a purpose of easy understanding, thus are not intended to limit the present invention to an illustrated mode. In addition, connection lines between blocks in drawings and the like, made reference in the following explanation, include both of bidirectional and one directional. One way arrow schematically indicates flow of main signal (data), thus does not exclude bidirectional. A program is executed via a computer apparatus, and the computer apparatus comprises, for example, a processor, a storage apparatus, an input apparatus, a communication interface and a display apparatus, as necessary. Further, the computer apparatus is configured in a manner capable of communicating with an internal equipment or an external equipment (including a computer) via the communication interface, in spite of a cable communication or a radio communication. In addition, input/output connection points of each block in the drawings have ports to interface, although omitted in the drawings.

First Exemplary Embodiment

A first exemplary embodiment of the present invention is explained in detail while referring to drawings. FIG. 1 is a diagram showing a configuration of the first exemplary embodiment of the present invention. Referring to FIG. 1, a signal control apparatus 10 is illustrated, which is connected to a plurality of traffic signals S located on a road (arterial road, trunk line) on which a system control is performed.

A predetermined offset according to installed position thereof is set to the plurality of traffic signals S so as to allow traffic on the road (arterial road) to flow smoothly. In addition, the intersections on which the plurality of traffic signals S are installed are provided with travel lanes with respectively designated traffic classifications. The following explanation is made under an assumption that the travel lanes with designated traffic classifications are turn right lanes.

The signal control apparatus 10 comprises a staying vehicle number detection part 11, a determination part 12, and a signal control part 13. The signal control apparatus 10 may be an apparatus that functions as a control apparatus in a control center, omitted in the drawings, a signal control apparatus that controls traffic signals installed on the road, an MEC (Multi-access Edge Computing) server that is superordinate (superior) to the signal control apparatus.

The staying vehicle number detection part 11 functions as means for detecting the number of vehicles staying in a travel lane or lanes of the same traffic classification among the travel lanes of the plurality of intersections. For example, they respectively detect the number of staying vehicles on a turn right lane at 3 traffic signals in lower section of FIG. 3 as 8, 6 and 1. Such number of staying vehicles, may be detected by, for example, an ultrasonic vehicle detector used as a sensitive traffic signal or cameras installed at intersections.

The determination part 12 determines whether or not to extend or shorten signaling time for permitting traffic of the traffic classification of the travel lane or lanes based on the number of vehicles staying in the travel lane or lanes of the same traffic classification at the plurality of intersections. For example, in a case where the number of staying vehicles on the turn right lane of 3 traffic signals is respectively detected as 8, 6 and 1, the determination part 12 determines to extend signaling time for permitting traffic of the traffic classification of the corresponding travel lane or lanes in a case where the total number of them is larger than a predetermined first threshold. While, for example, the determination part 12 determines to shorten the signaling time for permitting traffic of the traffic classification of the corresponding travel lane or lanes in a case where the total number of them is less than the predetermined first threshold.

The signal control part 13 adjusts split of the plurality of traffic signals based on a result of the determination by the determination part 12 so as to extend or reduce the signaling time for permitting traffic of the traffic classification of the travel lane or lanes while maintaining offset being set for the plurality of traffic signals.

Figure 2:
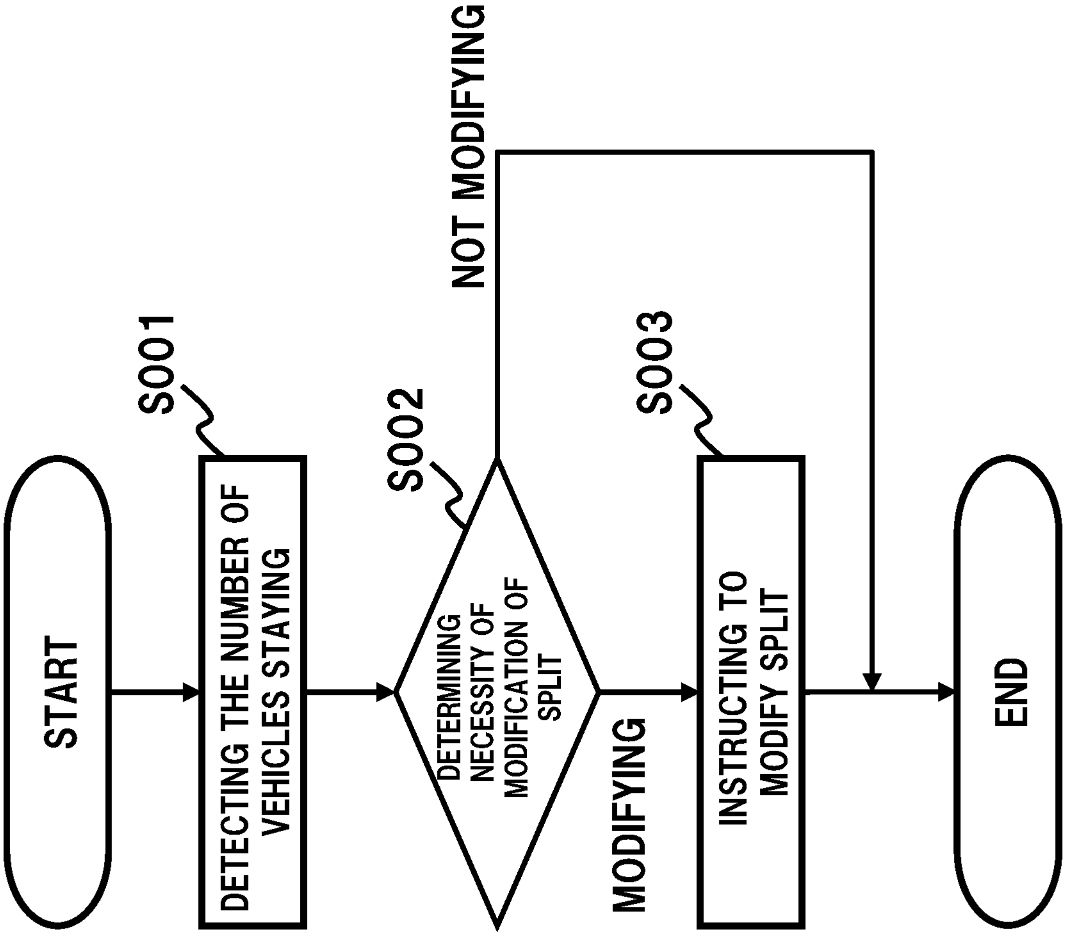
FIG. 2 is a flowchart diagram for explanation of operations by the signal control apparatus of the first exemplary embodiment of the present invention.

Next, operations in the present exemplary embodiment are explained in detail with reference to the drawings. FIG. 2 is a flowchart diagram for explanation of operations by the signal control apparatus of the first exemplary embodiment of the present invention. The signal control apparatus 10 executes processes indicated in FIG. 2 with a predetermined time interval. Herein, the predetermined time interval may be at least one or more times based on one cycle in which one round of signal change patterns of the traffic signals is performed.

First, the signal control apparatus 10 detects the number of vehicles staying on the turn right lane of each intersection at which the plurality of traffic signals are installed (STEP S001).

Next, the signal control apparatus 10 determines whether or not the split needs to be modified based on the number of the detected staying vehicles in the right turn lane, concretely, whether or not to extend or shorten the signaling time for a right turn permitting signal (STEP S002). In a case of determining that the signaling time for the right turn permitting signal is not extended or shortened (NOT MODIFYING in STEP S002), the signal control apparatus 10 terminates the processes without modifying the split.

On the other hand, in a case of determining that the signaling time for a right turn permitting signal is extended or shortened (MODIFYING in STEP S002), the signal control apparatus 10 extends or shortens the signaling time for a right turn permitting signal as the modification of the split while maintaining offset being set for the plurality of traffic signals (STEP S003).

Figure 3:
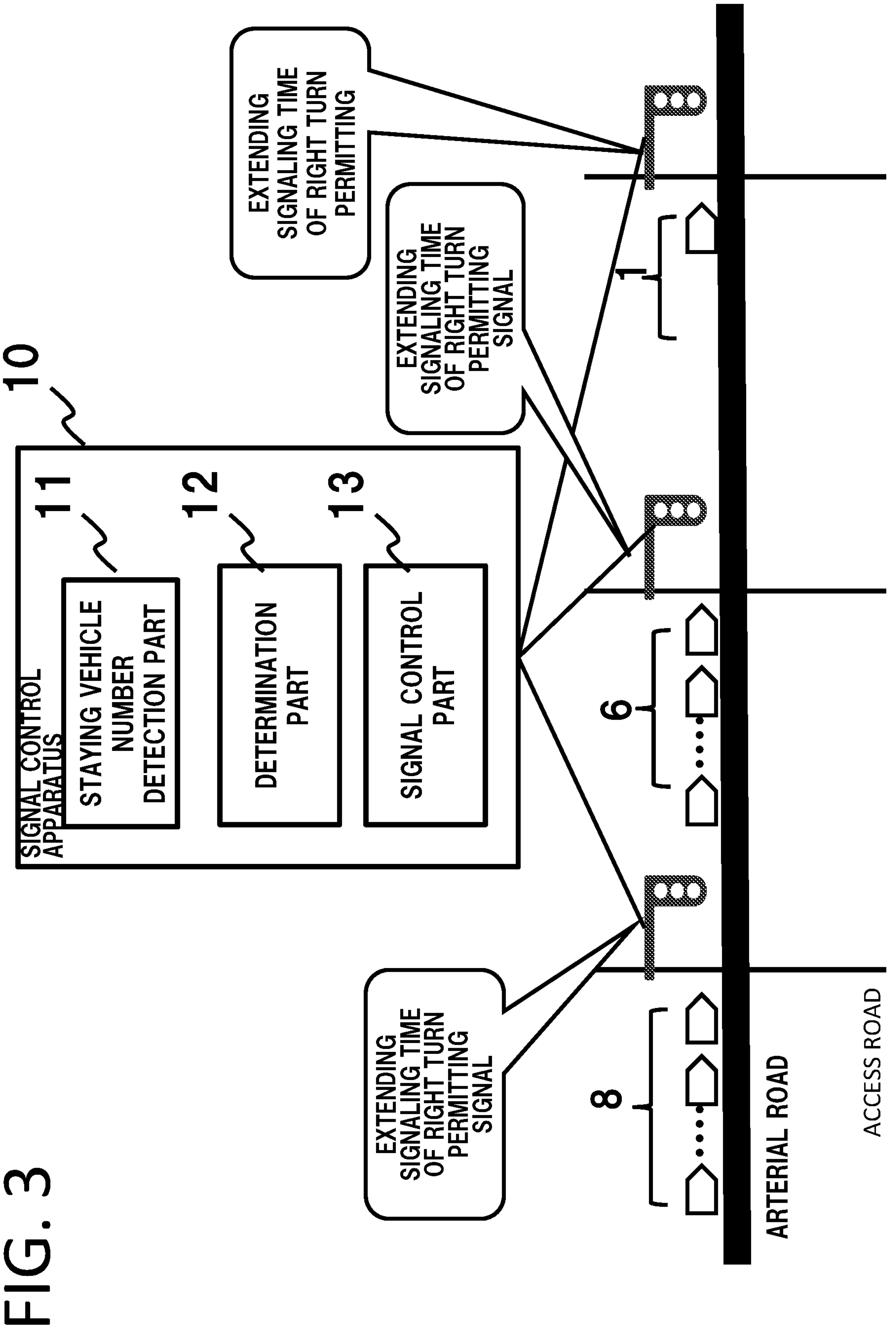
FIG. 3 is an explanatory diagram of operations by the signal control apparatus of the first exemplary embodiment of the present invention.
Figure 4:
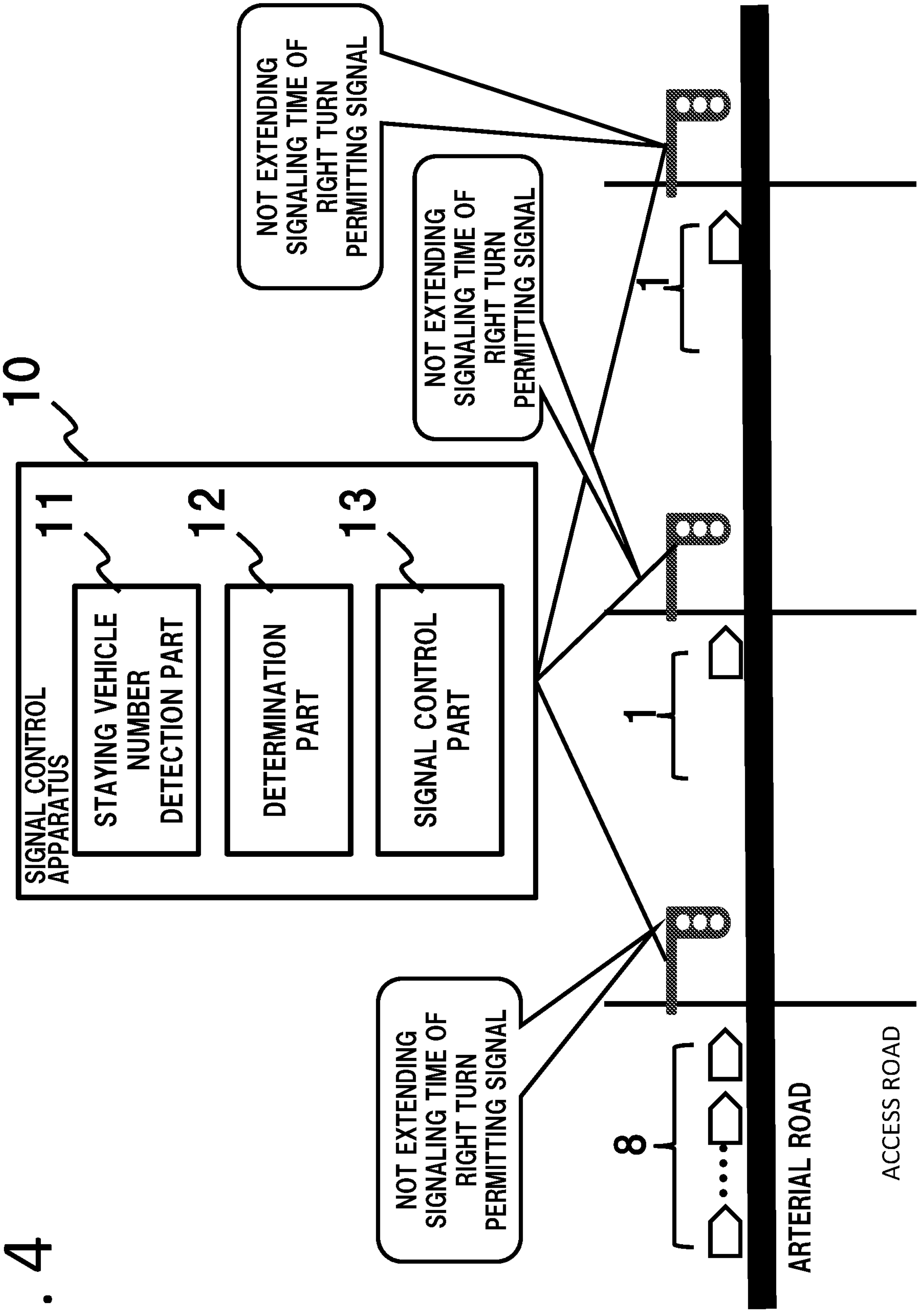
FIG. 4 is a further explanatory diagram of operations by the signal control apparatus of the first exemplary embodiment of the present invention.
Figure 5:
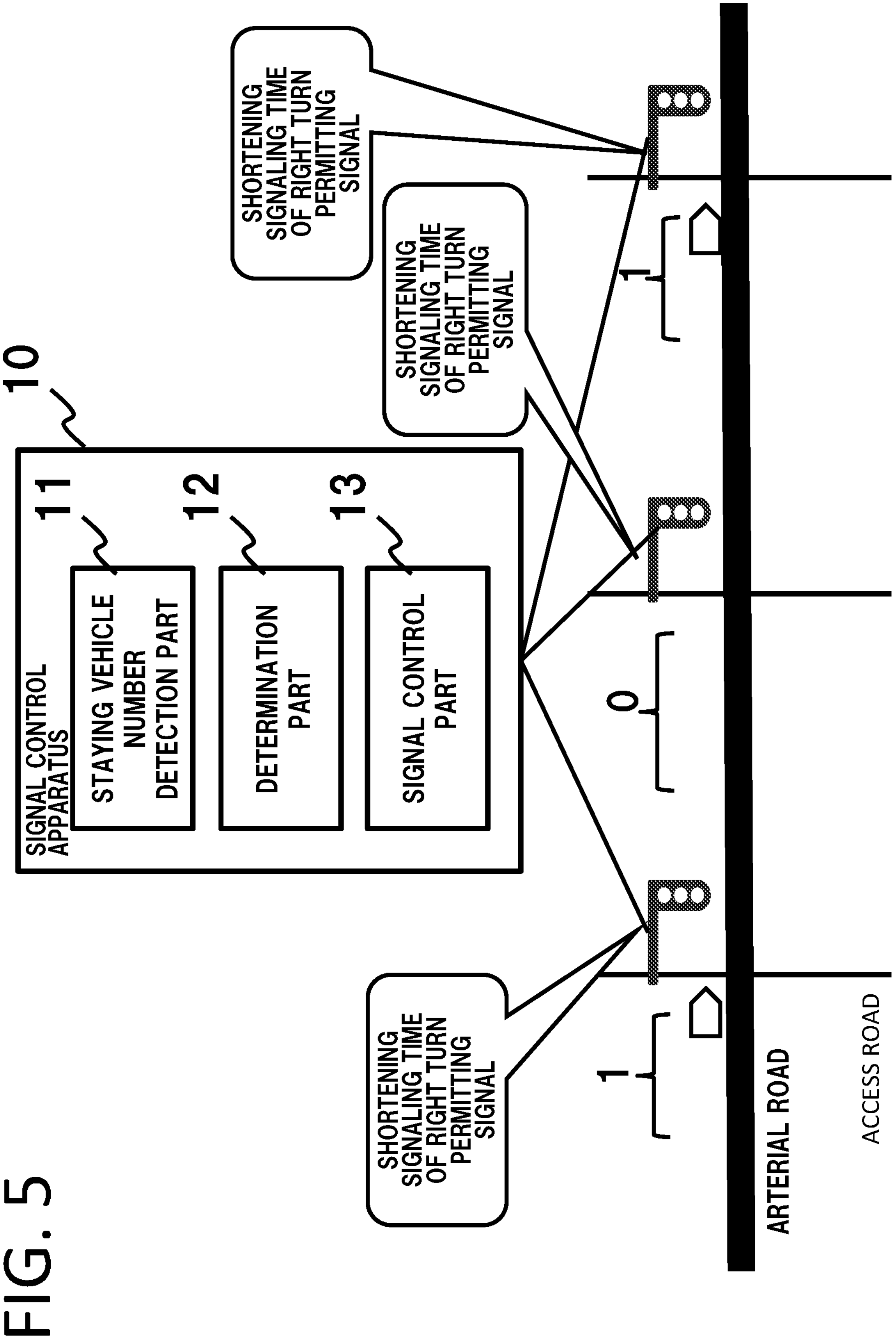
FIG. 5 is another explanatory diagram of operations by the signal control apparatus of the first exemplary embodiment of the present invention.

Next, concrete operations by the signal control apparatus 10 are explained concretely while using FIG. 3 to FIG. 5. For example, there is a premise that a threshold (first threshold) is set to determine that extension of the signaling time for a right turn permitting signal is required under a situation where the total number of staying vehicles on the turn right lanes of 3 traffic signals 15 or more. For example, in an example of FIG. 3, the number of staying vehicles on the turn right lane of 3 traffic signals is respectively 8, 6 and 1. In such case, since the total number of staying vehicles is 15, thus the signal control apparatus 10 determines that extension of the signaling time for the right turn permitting signal is required. Thereby, each of 3 traffic signals executes a process of extending the signaling time for the right turn permitting signal by the same time length while maintaining offset being set to each of them. Thereby, sweeping out of turn right vehicle is promoted at each of the intersections. In addition, since the offset is maintained upon the extension, system control in the straight ahead direction is not disturbed.

On the other hand, in an example of FIG. 4, the number of staying vehicles on the turn right lane of 3 traffic signals is respectively 8, 1 and 1. In such case, since the total number of staying vehicles is 10, the signal control apparatus 10 determines that extension of the signaling time for a right turn permitting signal is not required. The offset being set to each of the traffic signals is also maintained in this case.

In addition, for example, a threshold (second threshold) may be set, which is used for determination that shortening of the signaling time for a right turn permitting signal is required under a situation where the number of staying vehicles on the turn right lanes of 3 traffic signals is 3 or less. For example, in an example of FIG. 5, the number of staying vehicles on the turn right lanes is respectively 1, 0 and 1. In such case, since the total number is 2, the signal control apparatus 10 determines that shortening of the signaling time for the right turn permitting signal is required. In addition, the signal control apparatus 10 executes a process of shortening the signaling time for the right turn permitting signal for each of 3 traffic signals by the same time length while maintaining offset being set to each of them. Thereby, unnecessary signaling time of the right turn permitting signal is shortened at each of the intersections. In addition, since the offset is maintained upon the shortening, system control for straight ahead direction is not disturbed.

As explained above, according to the present exemplary embodiment, it is realized to improve efficiency of sweeping out of vehicle staying on turn right lanes while maintaining system control. Herein, although an example is exemplified in the above examples, in which a certain travel lane is the turn right lane, efficiency of sweeping out may be also similarly improved in a case where the certain travel lane is turn left lanes.

In addition, although it is explained in the above first exemplary embodiment that the number of staying vehicles on the turn right lanes in one direction of a road (arterial road) is detected and a light indicating the direction is controlled, it may be also configured that the number of staying vehicles on turn right lanes of both directions of the road (arterial road) so as to control the lights.

Second Exemplary Embodiment

Next, a second exemplary embodiment is explained in detail with reference to the drawings, in which a modification is added to a determination rule for determining whether or not to extend or reduce signaling time for permitting traffic of the traffic classification of the travel lane or lanes. A configuration of a signal control apparatus and operations of the second exemplary embodiment is almost common with the first exemplary embodiment, thus differences therebetween is mainly explained.

Figure 6:
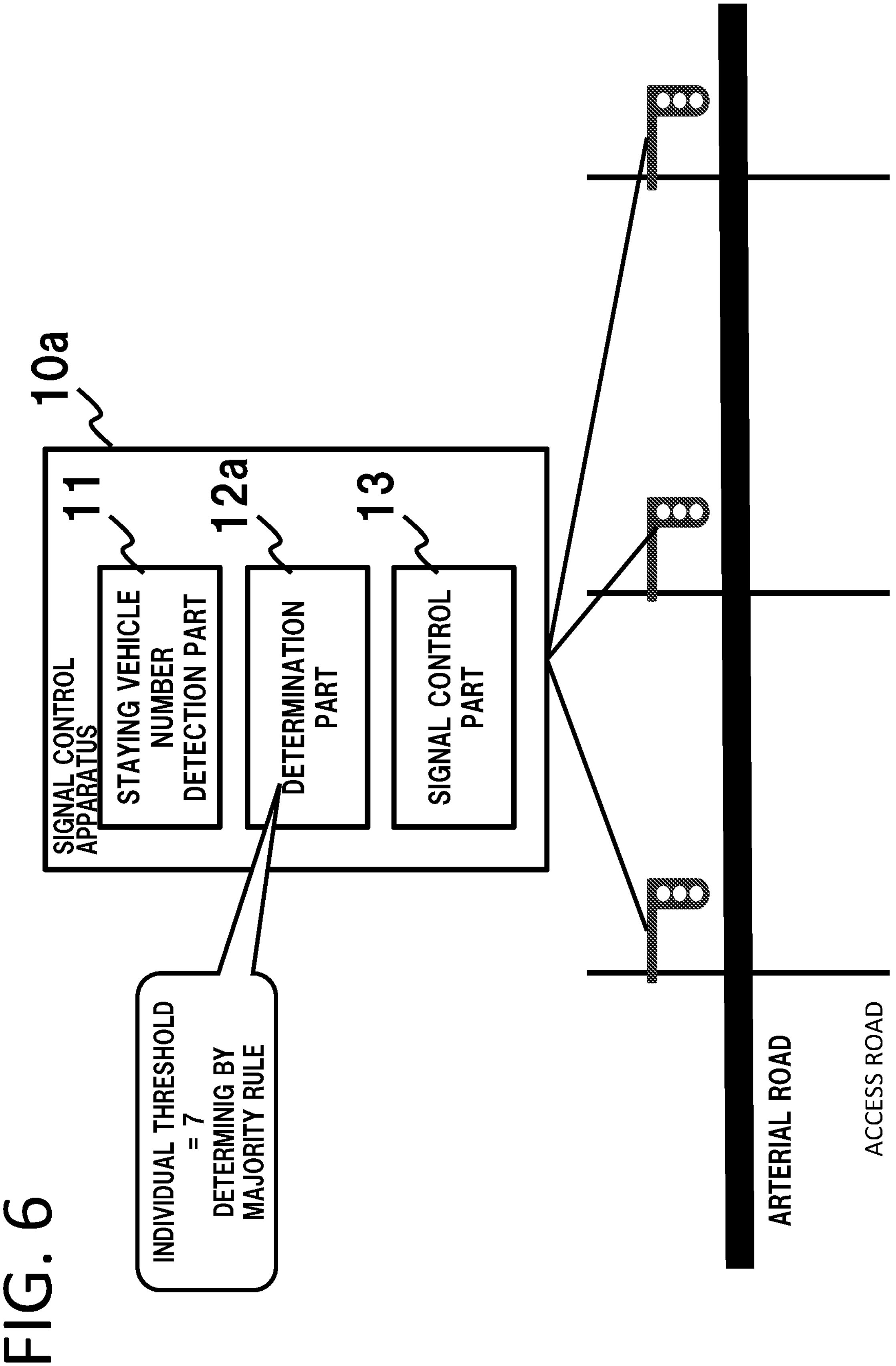
FIG. 6 is a diagram showing a configuration of a signal control apparatus of a second exemplary embodiment of the present invention.

FIG. 6 is a diagram showing a configuration of the signal control apparatus 10*a* of the second exemplary embodiment of the present invention. A determination part 12*a* compares the number of staying vehicles on turn right lane of each of 3 traffic signals with an individual threshold (second threshold, being set as "7" in FIG. 6) so as to determine whether extension or shortening of signaling time is required or not. In addition, the determination part 12*a* determines whether extension or shortening of entire signaling time is required or not based on the number of traffic signals S for which it is determined that extension or shortening of signaling time is required. Herein, in the example of FIG. 6, the determination part 12*a* determines that extension or shortening of entire signaling time is required if the number of traffic signals S which have determined that extension or shortening of signaling time is required exceeds a predetermined threshold (third threshold).

Figure 7:
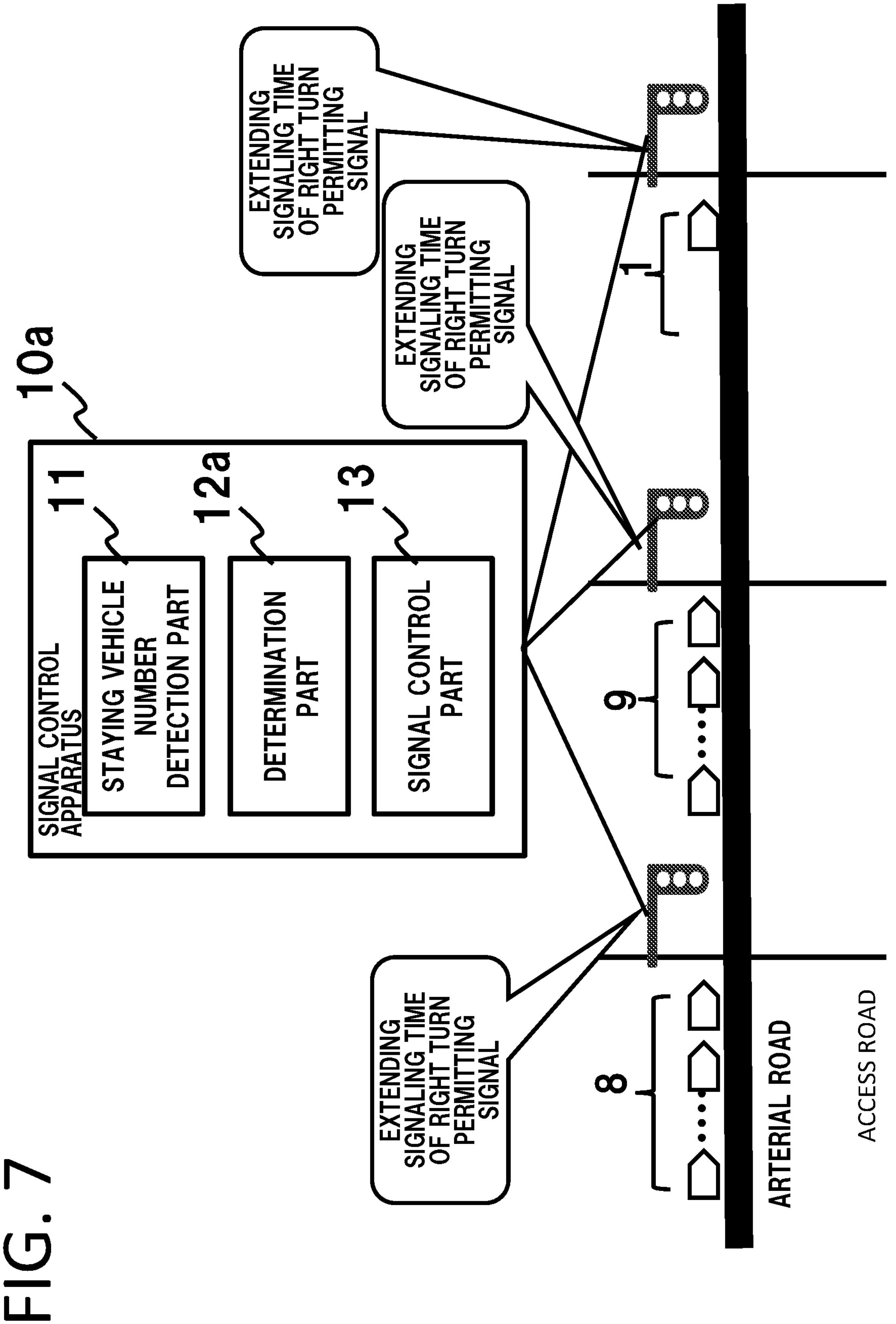
FIG. 7 is an explanatory diagram of operations by the signal control apparatus of the second exemplary embodiment of the present invention.
Figure 8:
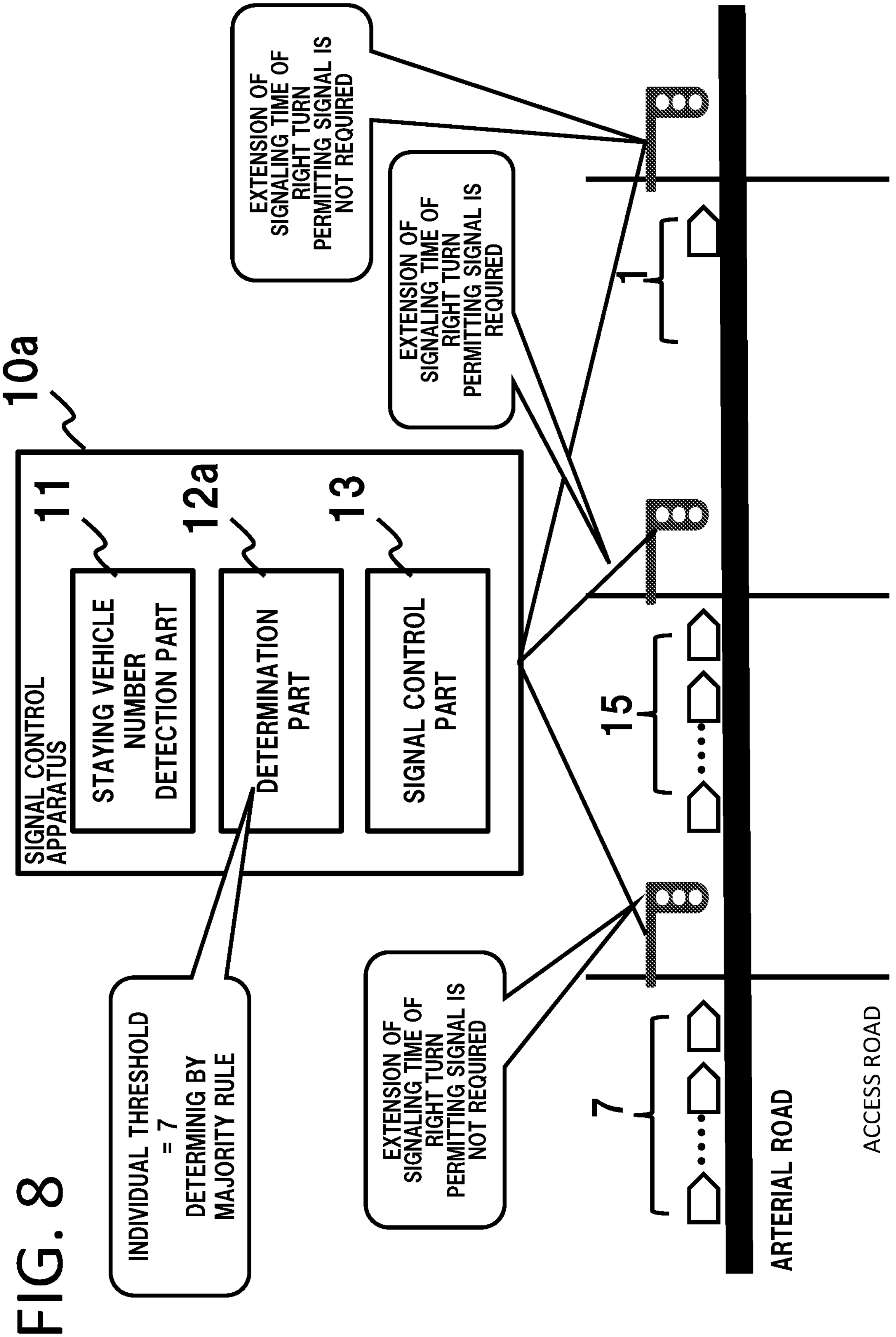
FIG. 8 is a further explanatory diagram of operations by the signal control apparatus of the second exemplary embodiment of the present invention.
Figure 9:
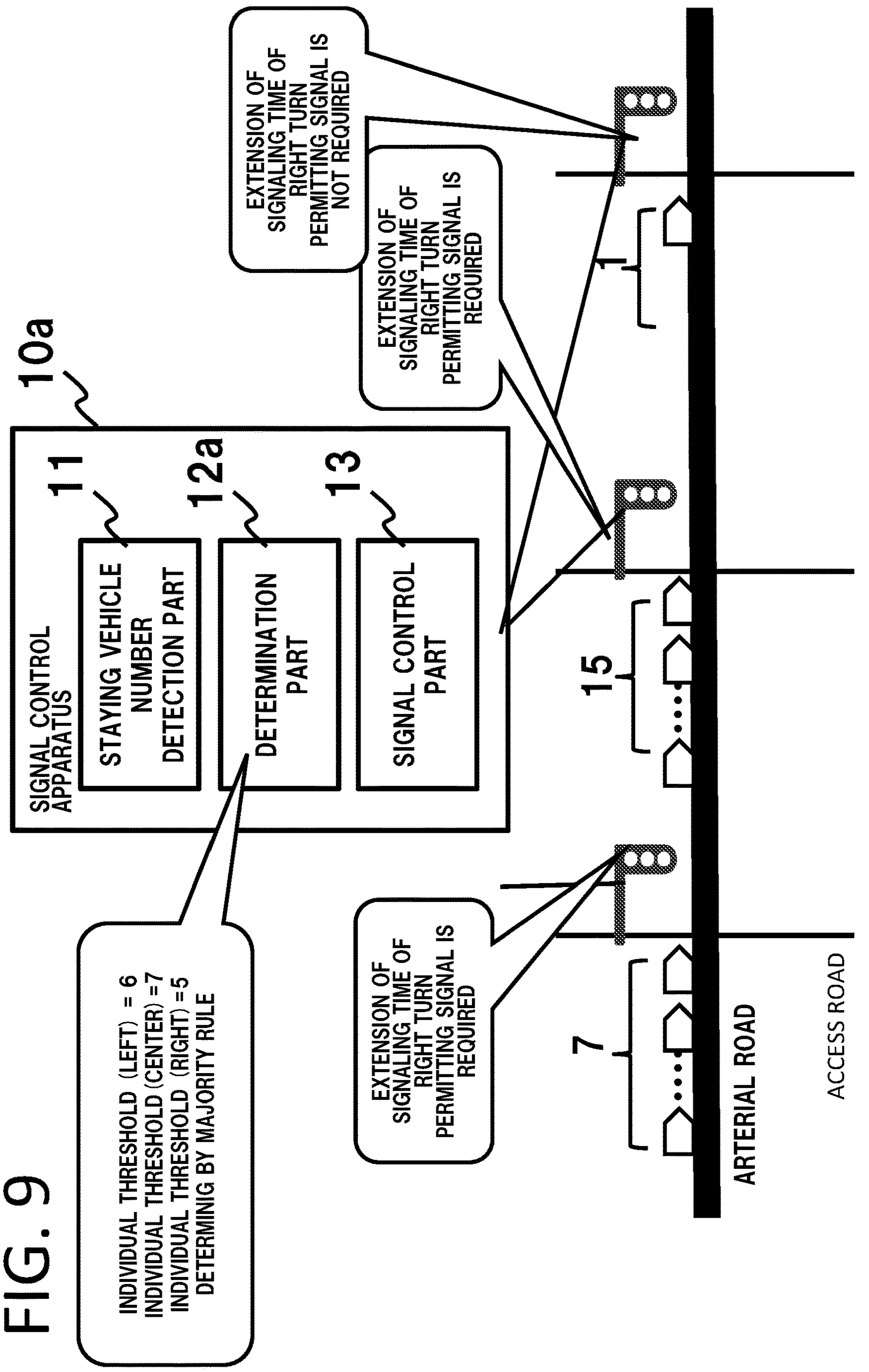
FIG. 9 is another explanatory diagram of operations by the signal control apparatus of the second exemplary embodiment of the present invention.

Next, concrete operations by the signal control apparatus 10*a* is more concretely explained using FIG. 7 to FIG. 9. For example, in an example of FIG. 7, the number of staying vehicles on turn right lanes of 3 traffic signals is 8, 9 and 1. In such case, as a result of comparison with the individual threshold (second threshold)=7, it is determined that extension of signaling time is required at the sites where 8 and 9 staying vehicles are found. In addition, since it has been determined that extension of signaling time is required for 2 traffic signals among 3 traffic signals entirely, the signal control apparatus 10*a* determines that extension of entire signaling time is required. Accordingly, in the case of FIG. 7, the signal control apparatus 10*a* performs a process of extending the signaling time for a right turn permitting signal by a same time length while maintaining offset being set to each of the traffic signals.

On the other hand, in an example of FIG. 8, the number of staying vehicles on turn right lanes of 3 traffic signals is 7, 15 and 1. In such case, as a result of comparison with the individual threshold (second threshold)=7, it is determined that extension of signaling time is required at only a center traffic signal where 15 staying vehicles are found. In addition, since it has been determined that extension of signaling time is required for 1 traffic signal among 3 traffic signals as a whole, the signal control apparatus 10*a* determines that extension of signaling time as a whole is not required. Accordingly, in the case of FIG. 8, extension of the signaling time for a right turn permitting signal is not performed.

Herein, in the present exemplary embodiment, as illustrated in FIG. 9, it is possible to modify the individual threshold to be compared with the number of staying vehicles of the turn right lane of each of the traffic signals. For example, in the example of FIG. 9, the individual threshold for a left-hand traffic signal of FIG. 9 is 6, the individual threshold for a center traffic signal is 7, and the individual threshold for a right-hand traffic signal of is 5. In such case, as a result of comparison with each of the individual thresholds, it is determined that extension of signaling time is required for the left-hand and center traffic signals. In addition, since it has been determined that extension of signaling time is required for 2 traffic signals among 3 traffic signals as a whole, the signal control apparatus 10*a* determines that extension of signaling time as a whole is required. Accordingly, in the case of FIG. 9, a process of extending the signaling time for a right turn permitting signal by the same time length while maintaining offset being set to each of the traffic signals. As described above, according to the present exemplary embodiment, it is possible to set thresholds according to traffic volume and the like at each intersection.

In addition, although the above exemplary embodiment is explained as such that it is determined that extension or shortening of signaling time as a whole is required in a case where the number of traffic signals which have determined that extension or shortening of signaling time is required occupy a majority of the whole number of traffic signals, another value as the third threshold may be set. For example, in a case where there are 5 traffic signals as a whole, it may be determined that extension or shortening of signaling time as a whole is required when 2 or more traffic signals, i.e., more than 1 traffic signal, are determined that extension or shortening of signaling time is required.

In addition, even in a case where the determining method does not determine that extension of signaling time is required, it may be determined that extension of signaling time is required if the number of staying vehicles on a turn right lane of a certain intersection exceeds a value (fourth threshold) which is larger than the second threshold. For example, in a state of FIG. 8, in a case where 14 is set as the fourth threshold, it may be determined that extension of signaling time is required regardless of the determinations for each of the traffic signals and the number of the traffic signals.

Since the first exemplary embodiment performs the determination based on the total number of staying vehicles, a case is assumed, in which it is determined that extension of signaling time is required even if the number of staying vehicles on a turn right lane of one intersection is extremely large and the number for the other intersections is small. On the other hand, the second exemplary embodiment may determine that extension of signaling time is not required under such situation (see FIG. 8). Further, as explained while using FIG. 9, it is also possible to perform determination according to the traffic conditions at the intersections by setting appropriate individual thresholds for each intersection and traffic signal.

Third Exemplary Embodiment

Figure 10:
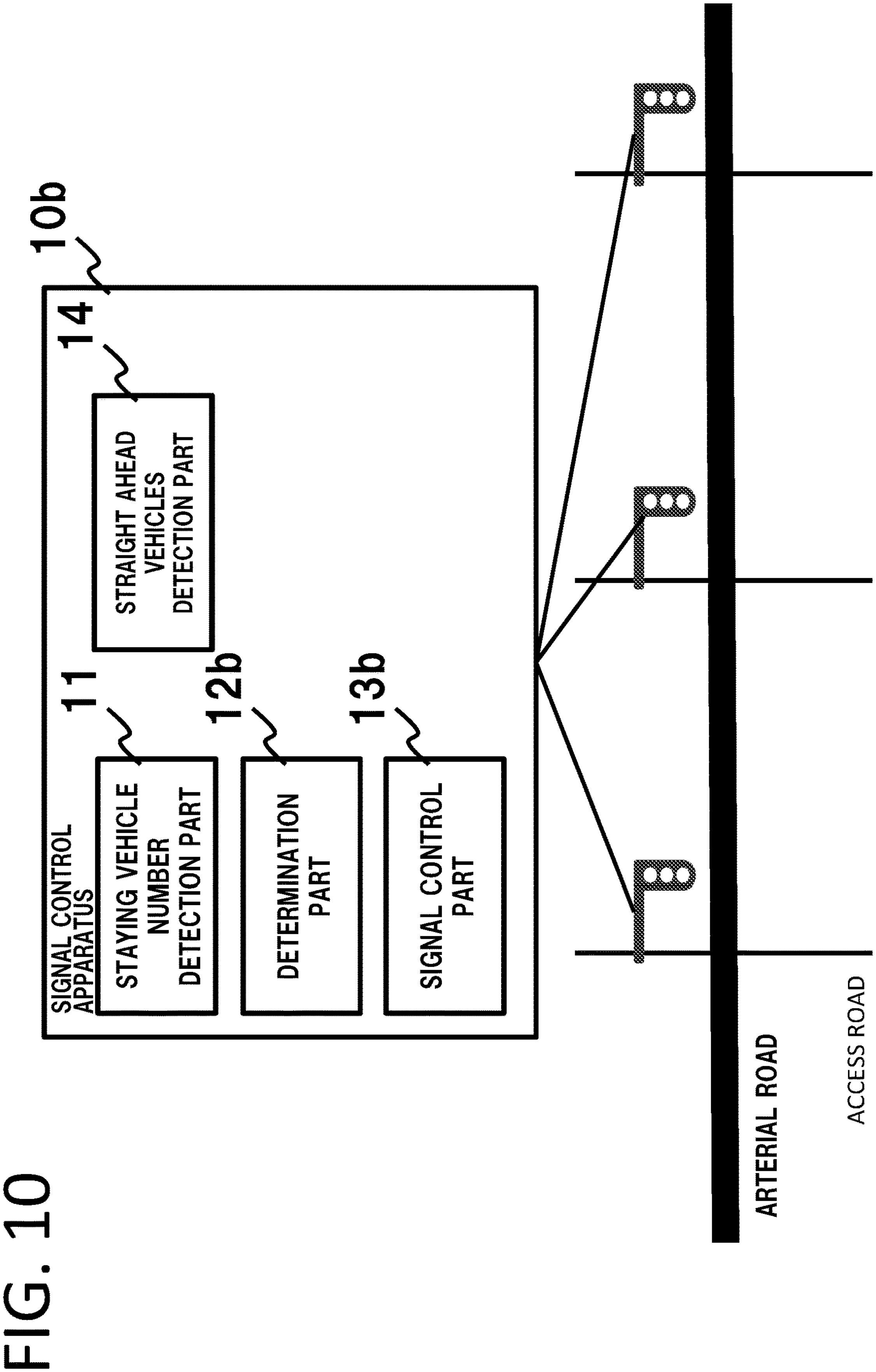
FIG. 10 is a diagram showing a configuration of a signal control apparatus of a third exemplary embodiment of the present invention.

Next, a third exemplary embodiment is explained in detail with reference to the drawings, in which signaling time of green light is shortened based on the length of an absent section of straight ahead vehicles on an opposite lane to a turn right vehicle. FIG. 10 is a diagram showing a configuration of a signal control apparatus of the third exemplary embodiment of the present invention. The signal control apparatus 10*b* of the third exemplary embodiment has a configuration in which a straight ahead vehicles detection part 14 is added to the configuration of the signal control apparatus 10 of the first exemplary embodiment. In addition, a determination part 12*b* has an additional function to determine whether or not to shorten signaling time of a green light in addition to the same functions of the first and second exemplary embodiments. The other configurations are the same as those of the first and second exemplary embodiments, thus differences therefrom are mainly explained.

The straight ahead vehicles detection part 14 functions as means for respectively detecting absent sections of straight ahead vehicles at an oncoming lane of the right-turn-only lane or lanes in a plurality of intersections at which traffic signals S as control targets are installed. The straight ahead vehicles detection part 14 may be configured with, for example, a camera, a sensor or the like, which is installed in traffic signals and the like in intersections.

The determination part 12*b* determines whether or not the number of intersections in which right-turn vehicles stay in the right-turn-only lane or lanes and in which the absent section of the straight ahead vehicles in the oncoming lane has a predetermined length or more exceeds a fifth threshold.

The signal control part 13*b* performs an early termination control of green light in a case where the determination part 12*b* has determined that the number of intersections in which right-turn vehicles stay in the right-turn-only lane or lanes and in which the absent section of the straight ahead vehicles in the oncoming lane has a predetermined length or more exceeds the fifth threshold. Herein, the "early termination control of green light" is that signaling timing for prohibiting the straight ahead vehicles at the lane opposite to a turn right lane from entering the intersection is brought forward and signaling timing for permitting traffic of the right-turning vehicles is brought forward. More concretely, a control is performed, in which green light is terminated earlier than usual, and red light and right arrow signal are switched earlier than usual. Further, the signal control part 13*b* of the present exemplary embodiment respectively performs the early termination control of green light while maintaining offset of each of the target traffic signals.

Figure 11:
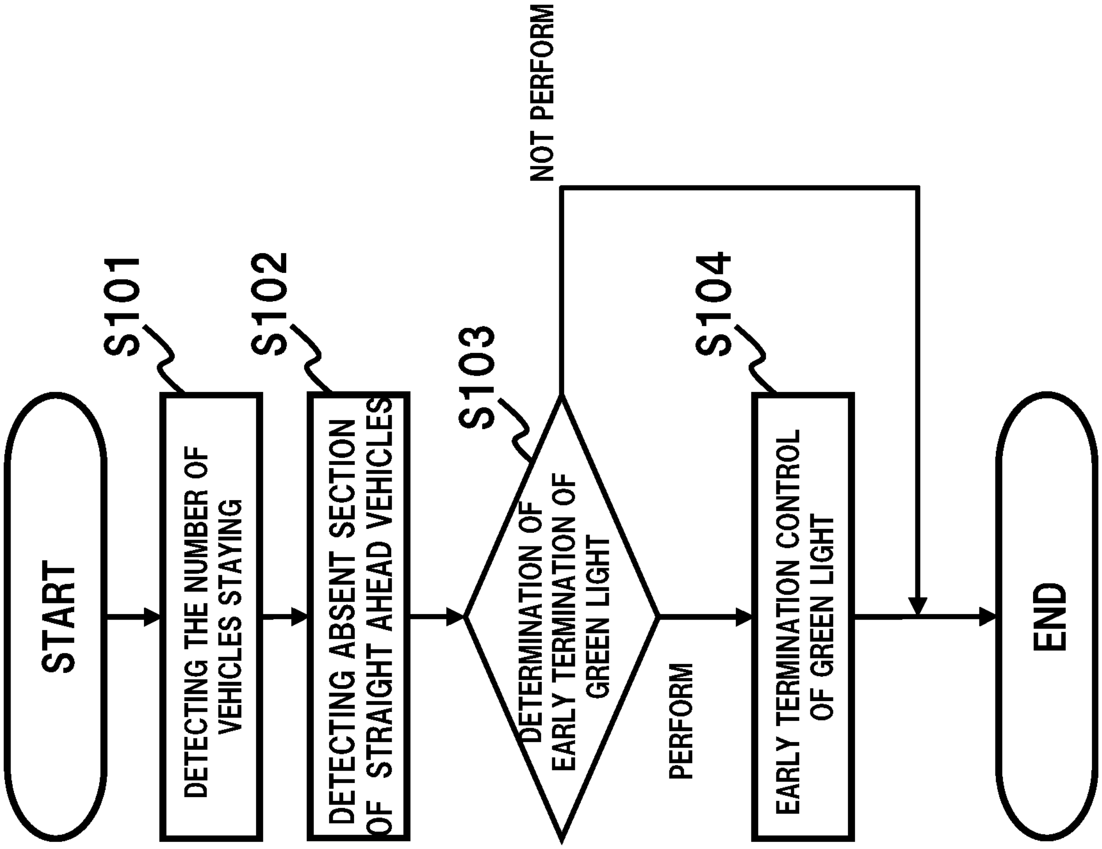
FIG. 11 is a flowchart diagram for explanation of operations by the signal control apparatus of the third exemplary embodiment of the present invention.

Next, operations in the present exemplary embodiment are explained in detail while referring to the drawings. FIG. 11 is a flowchart diagram for explanation of operations by the signal control apparatus of the third exemplary embodiment of the present invention. The signal control apparatus 10*b* executes processes indicated in FIG. 11 with a predetermined time interval. Herein, the predetermined time interval may be at least one or more times based on one cycle in which one round of signal change patterns of the traffic signals is performed.

First, the signal control apparatus 10*b* respectively detects the number of vehicles staying on the right-turn-only lane or lanes of each of the intersections at which the plurality of traffic signals are installed (STEP S101).

Next, the signal control apparatus 10*b* respectively detects absent section of straight ahead vehicles in an oncoming lane of the right-turn-only lane or lanes of each of the intersections (STEP S102).

Next, the signal control apparatus 10*b* obtains the number of intersections in which right-turn vehicles stay in the right-turn-only lane or lanes and in which the absent section of the straight ahead vehicles in the oncoming lane has a predetermined length or more. Furthermore, the signal control apparatus 10*b* determines whether or not to perform the "early termination control of green light" (STEP S103). Concretely, the signal control apparatus 10*b* determines to perform the "early termination control of green light" in a case where the number of intersections, in which right-turn vehicles stay in the right-turn-only lane or lanes and in which the absent section of the straight ahead vehicles in the oncoming lane has a predetermined length or more, exceeds a predetermined threshold (fifth threshold).

Herein, in a case of determining to not-perform the "early termination control of green light" (NOT PERFORM in STEP S103), the signal control apparatus 10*b* terminates processes without modification of split which corresponds to early termination of green lights. Concretely, in a case where right-turn vehicles do not stay in the right-turn-only lane or lanes or a case where the number of intersections having the absent section of the straight ahead vehicles in the oncoming lane has a predetermined length or more is the fifth threshold or less, the signal control apparatus 10*b* determines to not-perform the "early termination control of green light".

On the other hand, in a case of determining to perform the "early termination control of green light" (PERFORM in STEP S103), the signal control apparatus 10*b* performs the early termination control of green light (STEP S104).

Figure 12:
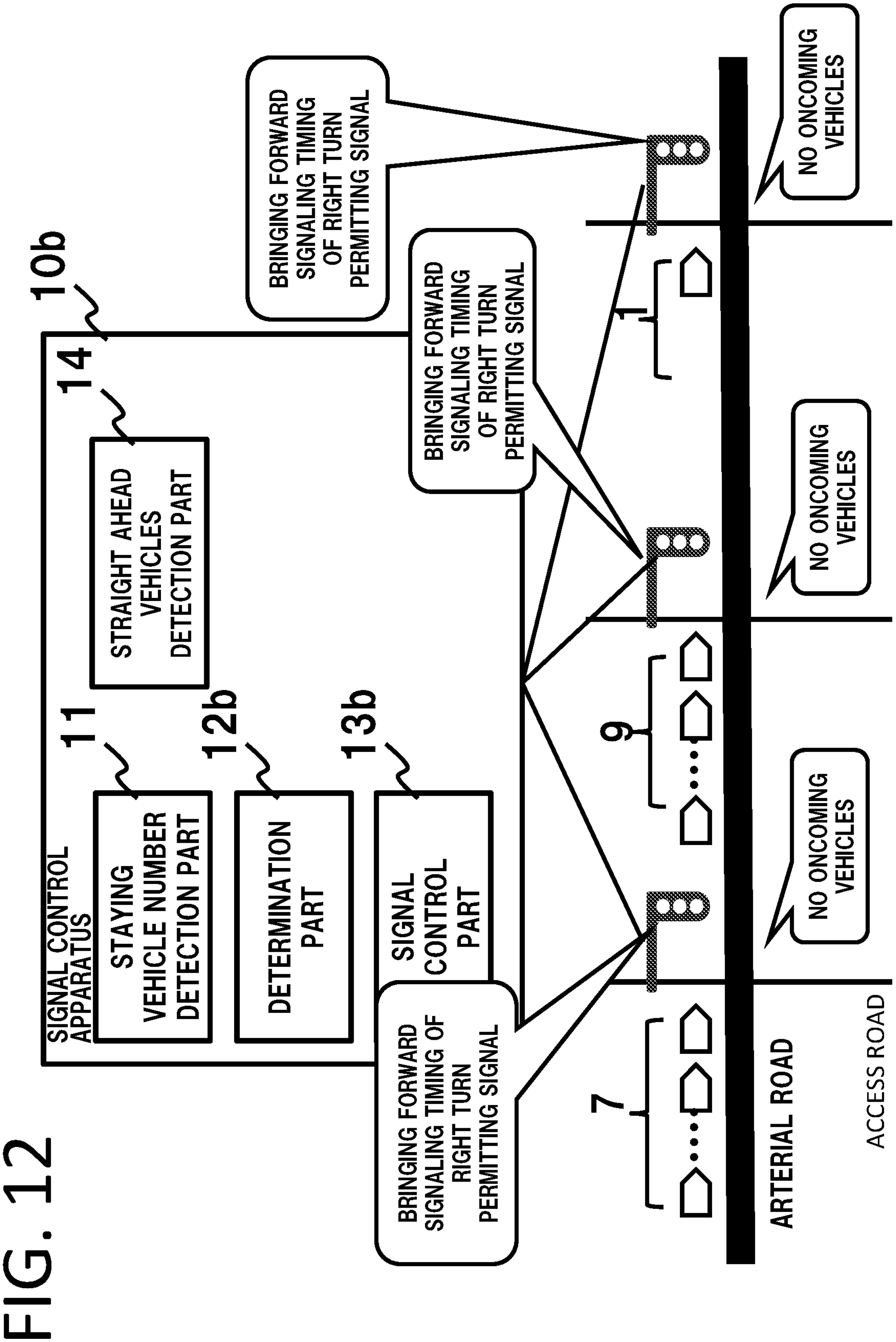
FIG. 12 is an explanatory diagram of operations by the signal control apparatus of the third exemplary embodiment of the present invention.

Next, concrete operations by the signal control apparatus 10*b* are concretely explained using FIG. 12. For example, in an example illustrated in a lower section of FIG. 12, vehicles stay on each of right-turn-only lane or lanes of 3 traffic signals and the number of intersections having the absent section of the straight ahead vehicles in the oncoming lane has a predetermined length or more exceeds a predetermined threshold (fifth threshold 32, for example, 2). In such case, the signal control apparatus 10*b* executes a process of terminating green light early and extending the signaling time for a right turn permitting signal by the same time length while maintaining offset being set to each of them in each of the 3 traffic signals as the "early termination control of green light". Thereby, sweeping out of turn right vehicles in each of the intersections is promoted. In addition, since the offset is maintained upon the extension, system control in straight ahead direction is not disturbed.

As explained above, according to the present exemplary embodiment, sweeping out of turn right vehicles may be promoted (advanced) since signaling timing of right turn permitting signal may be brought forward in a case where there are no opposing vehicles in each of intersections. Of course, the signaling time for a right turn permitting signal may be extended or shortened based on the number of vehicles staying on right-turn-only lane or lanes like as the first, second exemplary embodiments. For example, in a case where the number of staying vehicles which intend to turn right in each of intersections is small, signaling time of the other light(s) may be extended by shortening signaling of right turn permitting signal while bringing forward signaling timing of the right turn permitting signal. In addition, for example, in a case where the number of staying vehicles which intend to turn right in each of intersections is large, signaling of right turn permitting signal may be extended while bringing forward signaling timing of right turn permitting signal. At that time, in a case where the signaling time for a right turn permitting signal is extended by an extent of forwarding of the signaling timing of right turn permitting signal, affects on the other signaling are eliminated.

As described above, although each of the exemplary embodiments of the present invention is explained, the present invention is not limited to the exemplary embodiments and further variations, substitutions, and adjustments may be made to the extent that they do not depart from the basic technical concept of the present invention. For example, network configuration, configuration of each element, and representation form of data illustrated in each drawing are examples to aid in understanding the present invention, and thus are not limited to the configuration illustrated in these drawings.

Figure 13:
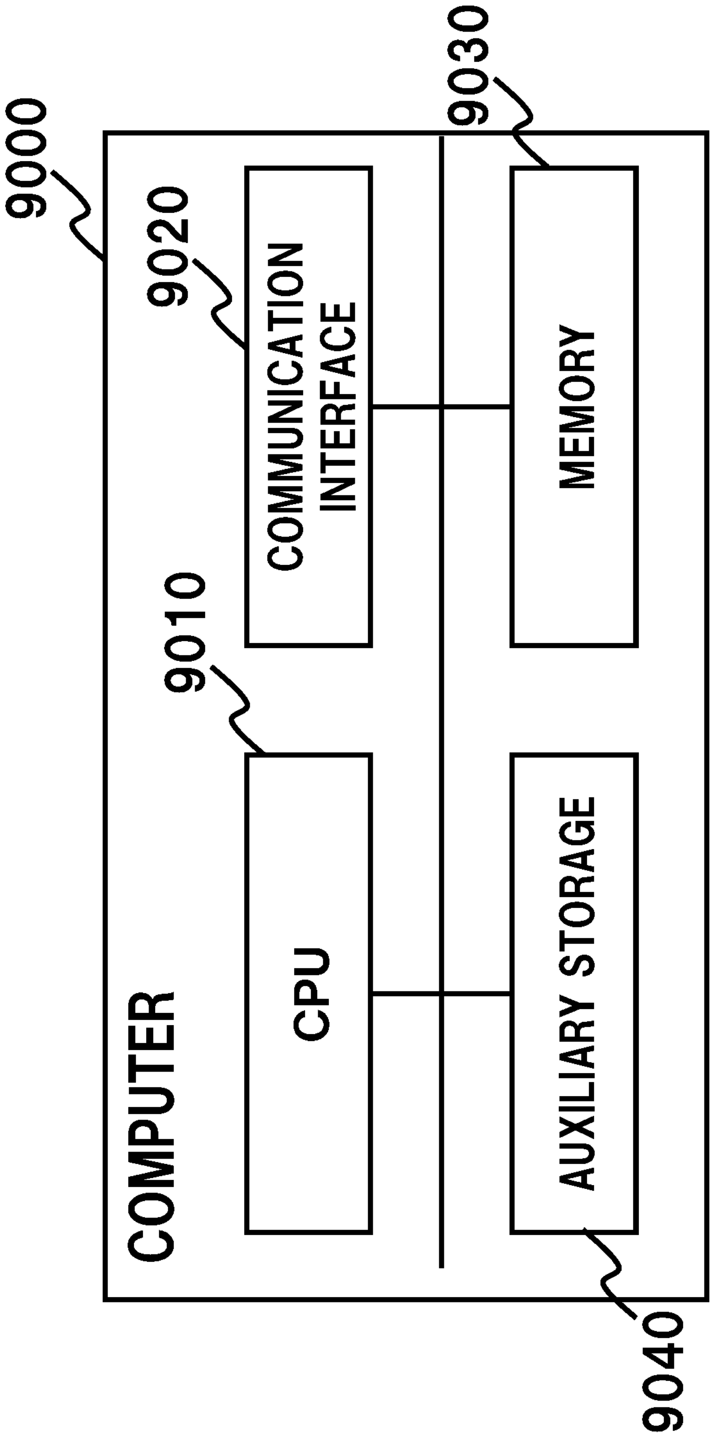
FIG. 13 is a diagram showing a configuration of a computer configuring a signal control apparatus of the present invention.

In addition, the operations described in the first to third example embodiments may be realized by a program that allows a computer (9000 in FIG. 13) functioning as the signal control apparatuses 10, 10*a*, 10*b*. Such computer is exemplified by a configuration in FIG. 13, that comprises a central processing unit (CPU) 9010, a communication interface 9020, a memory 9030, and an auxiliary storage 9040. That is, the CPU 9010 in FIG. 13 may execute a determination program for necessity of modification of signal control parameters or a modification program for the signal control parameters, and an update process of each calculation parameter stored in the auxiliary storage 9040 or the like.

That is, each part (processing means and functions) of the signal control apparatuses 10, 10*a*, and 10*b* indicated in the first to third exemplary embodiments above may be realized by a computer program that causes a processor mounted on the apparatuses to execute each of the above processes using its hardware.

At the last, preferable modes of the present invention are summarized.

[First Mode]

(See the signal control apparatus according to the first aspect.)

[Second Mode]

A configuration may be adopted, where the means for determining whether or not to extend or reduce signaling time for permitting traffic of the traffic classification of the travel lane or lanes of the signal control apparatus determines to respectively extend the signaling time for permitting traffic of the traffic classification of the travel lane or lanes when the number of vehicles staying in the travel lane or lanes of the same traffic classification at the plurality of intersections exceeds a predetermined threshold.

[Third Mode]

The means for determining whether or not to extend or reduce signaling time for permitting traffic of the traffic classification of the travel lane or lanes of the signal control apparatus may adopt a configuration to determine to respectively extend the signaling time for permitting traffic of the traffic classification of the travel lane or lanes in case the number of intersections at which the number of vehicles staying in the travel lane or lanes of the same traffic classification at the plurality of intersections respectively exceeds a predetermined second threshold exceeds a third threshold.

[Fourth Mode]

The means for determining whether or not to extend or reduce signaling time for permitting traffic of the traffic classification of the travel lane or lanes of the signal control apparatus may adopt a configuration to determine to respectively extend the signaling time for permitting traffic of the traffic classification of the travel lane or lanes regardless of a comparison result with the third threshold in case the number of vehicles staying in the travel lanes of the same traffic classification among the plurality of intersection exceeds a fourth threshold that is greater than the second threshold.

[Fifth Mode]

A configuration may be adopted, in which the travel lane or lanes are a right-turn-only lane or lanes or lanes, the signal control apparatus further comprises:

- means for respectively detecting absent section of straight ahead vehicles at an oncoming lane of the right-turn-only lane or lanes at the plurality of intersections and
- means for determining whether the number of intersections among the plurality of intersections exceeds a fifth threshold, in which right-turn vehicles stay in the right-turn-only lane or lanes and in which the absent section of the straight ahead vehicles in the oncoming lane has a predetermined length or more, and
- when the number of intersections among the plurality of intersections exceeds the fifth threshold, in which the right-turning vehicles stay in the right-turn-only lane or lanes and the absent section of the straight ahead vehicles in the oncoming lane or lanes has a predetermined length or more,
- the means for adjusting split of the plurality of traffic signals brings forward signaling timing for prohibiting the straight ahead vehicles at the opposite lane from entering the intersections at each of the plurality of traffic signals and brings forward signaling timing for permitting traffic of the right-turning vehicles.

[Sixth Mode]

It is preferable that the signal control apparatus is connected to traffic signals located on intersections of a road having 3 or more successive intersections having travel lanes with designated traffic classifications.

[Seventh Mode]

It is preferable that the signaling for permitting traffic of the traffic classification of the travel lane is green arrow light.

[Eighth Mode]

(See the signal control method according to the second aspect.)

[Ninth Mode]

(See the program according to the third aspect.)

Herein, the eighth to ninth modes may be developed to second to seventh modes, like as the first mode.

Herein, it is considered that each disclosure of the above Patent Literatures is incorporated herein by reference thereto, and the disclosures may be used as a base or a part of the present invention as necessary. Variations and adjustments of the example embodiments and examples are possible within the ambit of the entire disclosure (including the claims) of the present disclosure and based on the basic technical concept thereof. In addition, various combinations and selections (including non-selection) of various disclosed elements (including each element in each claim, each example embodiment, each drawing, etc.) are possible within the ambit of claims of the disclosure. Namely, the present disclosure of course includes various variations and modifications that could be made by those skilled in the art according to the overall disclosure including the claims and the technical concept.

In particular, the numerical range described in the present application should be interpreted as specifically describing any numerical value or subrange that falls within that range, even if not otherwise stated. Further, each of the disclosed matters of the above cited literatures is regarded as included in the described matters in the present application, if required, on the basis of the concept of the present disclosure, as a part of the present disclosure, also that a part or entire thereof is used in combination with a described matter(s) in the present application.

REFERENCE SIGNS LIST

10, 10*a*, 10*b*: signal control apparatus
11: staying-vehicle number detection part
12, 12*a*, 12*b*: determination part
13, 13*b*: signal control part
14: straight ahead vehicles detection part
9000: computer
9010: CPU
9020: communication interface
9030: memory
9040: auxiliary storage
S: traffic signals

What is claimed is:

1. A signal control apparatus, connected to a plurality of traffic signals located on a road with a plurality of intersections having travel lanes with designated traffic classifications, comprising:

at least a processor; and a memory in circuit communication with the processor;

wherein the processor is configured to execute:

detecting a number of vehicles staying in a travel lane or lanes of a same traffic classification among the travel lanes of the plurality of intersections;

determining whether or not to extend or reduce signaling time for permitting traffic of the traffic classification of the travel lane or lanes based on the number of vehicles staying in the travel lane or lanes of the same traffic classification at the plurality of intersections;

adjusting split of the plurality of traffic signals based on a result of the determination so as to extend or reduce the signaling time for permitting traffic of a traffic classification of the travel lane or lanes while maintaining offset being set for the plurality of traffic signals;

determining respectively extending the signaling time for permitting traffic of the traffic classification of the travel lane or lanes in case a number of intersections at which the number of vehicles staying in the travel lane or lanes of the same traffic classification at the plurality of intersections respectively exceeds a predetermined second threshold, and exceeds a third threshold; and determining respectively extending the signaling time for permitting traffic of the traffic classification of the travel lane or lanes regardless of a comparison result with the third threshold in case the number of vehicles staying in the travel lanes of the same traffic classification among the plurality of intersection exceeds a fourth threshold that is greater than the second threshold.

2. The signal control apparatus according to claim 1, wherein the processor determines to respectively extend the signaling time for permitting traffic of the traffic classification of the travel lane or lanes when the number of vehicles staying in the travel lane or lanes of the same traffic classification at the plurality of intersections exceeds a predetermined threshold.

3. The signal control apparatus according to claim 1, wherein the travel lane or lanes are a right-turn only lane or lanes, the processor further executes:

respectively detecting absent section of straight ahead vehicles at an oncoming lane of the right-turn-only lane or lanes at the plurality of intersections, determining whether a number of intersections among the plurality of intersections exceeds a fifth threshold, in which right-turn vehicles stay in the right-turn-only lane or lanes and in which the absent section of the straight ahead vehicles in the oncoming lane has a predetermined length or more, and when the number of intersections among the plurality of intersections exceeds the fifth threshold, in which the right-turning vehicles stay in the right-turn-only lane or lanes and the absent section of the straight ahead vehicles in the oncoming lane or lanes has a predetermined length or more, adjusting split of the plurality of traffic signals respectively brings forward signaling timing for prohibiting the straight ahead vehicles at the opposite lane from entering the intersections at the plurality of traffic signals and brings forward signaling timing for permitting traffic of the right-turning vehicles.

4. The signal control apparatus according to claim 1, which is connected to traffic signals located on intersections of a road having 3 or more successive intersections having travel lanes with designated traffic classifications.

5. The signal control apparatus according to claim 1, signaling for permitting traffic of the traffic classification of the travel lane is a green arrow light.

6. The signal control apparatus according to claim 1, wherein the processor is further configured to execute the instructions to:

as the second threshold, set a different value for each of the plurality of intersections.

7. A signal control method, wherein a signal control apparatus connected to a plurality of traffic signals located on a road with a plurality of intersections having travel lanes with designated traffic classifications executes:

detecting a number of vehicles staying in a travel lane or lanes of a same traffic classification among the travel lanes of the plurality of intersections;

determining whether or not to extend or reduce signaling time for permitting traffic of a traffic classification of the travel lane or lanes based on the number of vehicles staying in the travel lane or lanes of the same traffic classification at the plurality of intersections;

adjusting split of the plurality of traffic signals based on a result of the determination so as to extend or reduce the signaling time for permitting traffic of the traffic classification of the travel lane or lanes while maintaining offset being set for the plurality of traffic signals;

determining respectively extending the signaling time for permitting traffic of the traffic classification of the travel lane or lanes in case a number of intersections at which the number of vehicles staying in the travel lane or lanes of the same traffic classification at the plurality of intersections respectively exceeds a predetermined second threshold, and exceeds a third threshold; and determining respectively extending the signaling time for permitting traffic of the traffic classification of the travel lane or lanes regardless of a comparison result with the third threshold in case the number of vehicles staying in the travel lanes of the same traffic classification among the plurality of intersection exceeds a fourth threshold that is greater than the second threshold.

8. The signal control method according to claim 7, wherein the signal control apparatus determines to respectively extend the signaling time for permitting traffic of the traffic classification of the travel lane or lanes when the number of vehicles staying in the travel lane or lanes of the same traffic classification at the plurality of intersections exceeds a predetermined threshold.

9. The signal control method according to claim 7, wherein the travel lane or lanes are a right-turn only lane or lanes, the signal control apparatus further executes:

respectively detecting absent section of straight ahead vehicles at an oncoming lane of the right-turn-only lane or lanes at the plurality of intersections;

determining whether a number of intersections among the plurality of intersections exceeds a fifth threshold, in which right-turn vehicles stay in the right-turn-only lane or lanes and in which the absent section of the straight ahead vehicles in the oncoming lane has a predetermined length or more; and when the number of intersections among the plurality of intersections exceeds the fifth threshold, in which the right-turning vehicles stay in the right-turn-only lane or lanes and the absent section of the straight ahead vehicles in the oncoming lane or lanes has a predetermined length or more, adjusting split of the plurality of traffic signals respectively brings forward signaling timing for prohibiting the straight ahead vehicles at the opposite lane from entering the intersections at the plurality of traffic signals and brings forward signaling timing for permitting traffic of the right-turning vehicles.

10. The signal control method according to claim 7, wherein the signal control apparatus is connected to traffic signals located on intersections of a road having 3 or more successive intersections having travel lanes with designated traffic classifications.

11. The signal control method according to claim 7, wherein signaling for permitting traffic of the traffic classification of the travel lane is a green arrow light.

12. The signal control method according to claim 7, wherein the signal control apparatus further executes the instructions to:

as the second threshold, set a different value for each of the plurality of intersections.

13. A non-transitory computer readable medium storing a program, wherein the program causes a computer configuring a signal control apparatus connected to a plurality of traffic signals located on a road with a plurality of intersections having travel lanes with designated traffic classification to execute:

detecting a number of vehicles staying in a travel lane or lanes of a same traffic classification among the travel lanes of the plurality of intersections;

determining whether or not to extend or reduce signaling time for permitting traffic of a traffic classification of the travel lane or lanes based on the number of vehicles staying in the travel lane or lanes of the same traffic classification at the plurality of intersections; and adjusting split of the plurality of traffic signals based on a result of the determination so as to extend or reduce the signaling time for permitting traffic of the traffic classification of the travel lane or lanes while maintaining offset being set for the plurality of traffic signals;

determining respectively extending the signaling time for permitting traffic of the traffic classification of the travel lane or lanes in case a number of intersections at which the number of vehicles staying in the travel lane or lanes of the same traffic classification at the plurality of intersections respectively exceeds a predetermined second threshold, and exceeds a third threshold; and determining respectively extending the signaling time for permitting traffic of the traffic classification of the travel lane or lanes regardless of a comparison result with the third threshold in case the number of vehicles staying in the travel lanes of the same traffic classification among the plurality of intersection exceeds a fourth threshold that is greater than the second threshold.

14. The medium according to claim 13, wherein the computer is caused to execute: determining to respectively extend the signaling time for permitting traffic of the traffic classification of the travel lane or lanes when the number of vehicles staying in the travel lane or lanes of the same traffic classification at the plurality of intersections exceeds a predetermined threshold.

15. The medium according to claim 13, wherein the travel lane or lanes are a right-turn only lane or lanes, the computer is caused to further execute:

respectively detecting absent section of straight ahead vehicles at an oncoming lane of the right-turn-only lane or lanes at the plurality of intersections;

determining whether a number of intersections among the plurality of intersections exceeds a fifth threshold, in which right-turn vehicles stay in the right-turn-only lane or lanes and in which the absent section of the straight ahead vehicles in the oncoming lane has a predetermined length or more; and when the number of intersections among the plurality of intersections exceeds the fifth threshold, in which the right-turning vehicles stay in the right-turn-only lane or lanes and the absent section of the straight ahead vehicles in the oncoming lane or lanes has a predetermined length or more, adjusting split of the plurality of traffic signals respectively brings forward signaling timing for prohibiting the straight ahead vehicles at the opposite lane from entering the intersections at the plurality of traffic signals and brings forward signaling timing for permitting traffic of the right-turning vehicles.

16. The medium according to claim 13, wherein the signal control apparatus is connected to traffic signals located on intersections of a road having 3 or more successive intersections having travel lanes with designated traffic classifications.

17. The medium according to claim 13, wherein the program further causes the computer to execute:

as the second threshold, set a different value for each of the plurality of intersections.

* * * * *